US012573765B2

(12) United States Patent
Dai et al.

(10) Patent No.: US 12,573,765 B2
(45) Date of Patent: Mar. 10, 2026

(54) ANTENNA ASSEMBLY, ANTENNA ASSEMBLY ARRAY, AND BASE STATION

(71) Applicant: HUAWEI TECHNOLOGIES CO., LTD., Shenzhen (CN)

(72) Inventors: Zuoxing Dai, Shanghai (CN); Lei Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 18/518,689

(22) Filed: Nov. 24, 2023

(65) Prior Publication Data

US 2024/0088540 A1 Mar. 14, 2024

Related U.S. Application Data

(63) Continuation of application No. PCT/CN2022/094211, filed on May 20, 2022.

(30) Foreign Application Priority Data

May 27, 2021 (CN) ........................ 202110584631.2

(51) Int. Cl.
*H01Q 19/10* (2006.01)
*H01Q 3/30* (2006.01)
*H01Q 1/24* (2006.01)

(52) U.S. Cl.
CPC ............ *H01Q 19/106* (2013.01); *H01Q 3/30* (2013.01); *H01Q 1/246* (2013.01)

(58) Field of Classification Search
CPC .......... H01Q 1/246; H01Q 3/30; H01Q 15/14; H01Q 15/18; H01Q 19/106
See application file for complete search history.

(56) References Cited

U.S. PATENT DOCUMENTS 9,620,860 B2 * 4/2017 Asplund .............. H01Q 13/206
2004/0150561 A1 * 8/2004 Tillery .................. H01Q 21/08 343/846

(Continued)

FOREIGN PATENT DOCUMENTS

CA 2722451 A1 * 10/2009 ............ H01Q 1/246
CN 105576351 A 5/2016

(Continued)

OTHER PUBLICATIONS

Li Xin et al.: "Phase-only shaping optimization method for array antennas based on joint using variable metric algorithms", Chinese Journal of Radio Science, vol. 23, No. 2, with English abstract, total 5 pages, Apr. 2008.

(Continued)

*Primary Examiner* — Daniel Munoz

(57) ABSTRACT

An antenna assembly is provided. The antenna assembly provided in this application includes a reflection panel and a radiating array. The reflection panel includes a reflection surface, the radiating array includes N radiating elements, and the N radiating elements are sequentially disposed on the reflection surface along a first direction. The reflection surface includes a deflection surface, and a normal direction of the deflection surface is disposed at an acute angle with the first direction. The N radiating elements are attached to the reflection surface, and at least one radiating element of the N radiating elements is located on the deflection surface, so that a radiation direction of the at least one radiating element is disposed at an acute angle with the first direction. In such antenna assembly, radiation power of the antenna assembly in a direction opposite to the first direction can be effectively reduced.

20 Claims, 11 Drawing Sheets

(56) References Cited

U.S. PATENT DOCUMENTS

| | | | | |
|---|---|---|---|---|
| 2007/0273607 | A1 | 11/2007 | Chen | |
| 2016/0380360 | A1* | 12/2016 | Gruener | H01Q 21/061<br>343/700 MS |

FOREIGN PATENT DOCUMENTS

| | | | |
|---|---|---|---|
| CN | 210074168 | U | 2/2020 |
| JP | 2007329666 | A | 12/2007 |
| WO | 2018049692 | A1 | 3/2018 |

OTHER PUBLICATIONS

Huang Youhuo :"Research on Mobile Base Station Antennas and Beamforming Antennas", Xi'an University of Electronic Science and Technology, with English abstract, total 128 pp. 2009-9-1.

International Search Report and Written Opinion issued in PCT Application No. PCT/CN2022/094211 dated Jul. 29, 2022.

Extended European Search Report issued in EP Application No. 22810480.8 dated Nov. 6, 2024.

* cited by examiner

ANTENNA ASSEMBLY, ANTENNA ASSEMBLY ARRAY, AND BASE STATION

CROSS-REFERENCE TO RELATED APPLICATIONS

This application is a continuation of International Application No. PCT/CN2022/094211, filed on May 20, 2022, which claims priority to Chinese Patent Application No. 202110584631.2, filed on May 27, 2021. The disclosures of the aforementioned applications are hereby incorporated by reference in their entireties.

TECHNICAL FIELD

This application relates to the field of communication technologies, and in particular, to an antenna assembly, an antenna assembly array, and a base station.

BACKGROUND

In order to meet people's communication requirements, more base station antenna assemblies are widely used in cities, towns, and other regions. In actual application, when a level value of an upper side lobe of a base station antenna assembly is greater than a limit value, communication quality of another surrounding wireless device is affected. In addition, in some cases, signal transmission between a satellite and a terrestrial communication device may be interfered with. Therefore, the level value of the upper side lobe of the base station antenna assembly needs to be suppressed.

Currently, a main manner of suppressing the upper side lobe of the base station antenna assembly is array amplitude weighting, phase weighting, or a combination of array amplitude weighting and the phase weighting. However, in this manner, radiation efficiency of the antenna assembly is significantly reduced. Therefore, currently, an antenna assembly that can effectively suppress a level value of an upper side lobe and ensure radiation efficiency is urgently needed.

SUMMARY

This application provides an antenna assembly that can effectively suppress a level value of an upper side lobe and ensure radiation efficiency, an antenna assembly array, and a base station.

According to one aspect, an embodiment of this application provides an antenna assembly, including a reflection panel and a radiating array. The reflection panel includes a reflection surface, and the radiating array is disposed on the reflection surface. The radiating array includes N radiating elements, and the N radiating elements are sequentially disposed on the reflection surface along a first direction. The reflection surface includes a deflection surface, and a normal direction of the deflection surface is disposed at an acute angle with the first direction. The N radiating elements are attached to the reflection surface, and at least one radiating element of the N radiating elements is located on the deflection surface, so that a radiation direction of the at least one radiating element is disposed at an acute angle with the first direction, where N is an integer greater than 1. Specifically, the reflection panel generally includes two plate surfaces that are opposite to each other, and one of the plate surfaces may be used as the reflection surface. That is, the N radiating elements in the radiating array are all located on a same plate surface of the reflection panel. In the antenna assembly provided in this embodiment of this application, after the radiation direction of the at least one radiating element is disposed at the acute angle with the first direction, radiation power of the antenna assembly in a direction opposite to the first direction can be effectively reduced. For example, in actual application, if the ground is used as a reference, the first direction may be a direction that is substantially perpendicular to the ground and points to the ground. A radiation direction of a radiating element is a maximum radiation direction of a main lobe in a pattern of the radiating element. In actual application, when the antenna assembly is used in a communication device, for example, a base station for use, the first direction may point vertically to the ground, or be substantially perpendicular to the ground. After the radiation direction of the radiating element is disposed at an acute angle with a direction that points vertically to the ground, the main lobe, an upper side lobe, and a lower side lobe in the pattern of the radiating element tilt toward the ground, so that a level value of radiation of the radiating element in a high-altitude direction can be reduced. In addition, for the entire radiating array, by using a principle of pattern multiplication for antenna array, when the radiation direction of the at least one radiating element is at the acute angle with the first direction, an upper side lobe of the antenna assembly may be effectively suppressed, thereby reducing radiation power of the antenna assembly in the high altitude. For the principle of pattern multiplication for antenna array, in general, patterns of all radiating elements in the radiating array are superimposed, to obtain a pattern of the entire radiating array. In the pattern of the entire radiating array, the radiation direction of the at least one radiating element tilts toward the ground. Therefore, after the antenna patterns of the N radiating elements are superimposed, a level value of radiation of the entire radiating array in the high-altitude direction decreases. In addition, the radiating array may reduce the level value of radiation in the high-altitude direction without weighting (for example, array amplitude weighting, phase weighting, or a combination of the array amplitude weighting and the phase weighting). Therefore, each radiating element may further implement same transmit power, and aperture utilization is high, so that radiation efficiency of the antenna assembly is not affected.

It may be understood that, in the antenna assembly provided in this embodiment of this application, the first direction uses a structure of the reflection panel as a reference, instead of using the ground as a reference. That is, the first direction may be a direction from a first end to a second end of the reflection panel. The first end and the second end are opposite ends of the reflection panel. Therefore, during actual installation and use, a posture of the antenna assembly may be adjusted based on an actual situation, so that the first direction is perpendicular to the ground, or is substantially perpendicular to the ground.

In some embodiments, the deflection surface may be a plane or a curved surface. In actual application, a shape of the deflection surface may be properly selected based on an actual requirement, and flexibility is high. A normal direction of a deflection surface is a direction extending away from the deflection surface along a normal direction of the deflection surface starting from a point on the deflection surface.

In addition, when radiation directions of at least two radiating elements in the N radiating elements are disposed at an acute angle with the first direction, included angles between the at least two radiating elements and the first direction may be the same or different.

Alternatively, in specific implementation, a plurality of deflection surfaces may be disposed, or only one deflection surface may be disposed. Alternatively, it may also be understood that one radiating element or a plurality of radiating elements may be disposed on a same deflection surface.

As a whole, the reflection surface may be an undulating structure having a ridged part and a recessed part. For example, along the first direction, from a direction perpendicular to the reflection surface, a cross section of the reflection surface may be sinusoidal, zigzag or another irregular shape with ups and downs.

In addition, in specific application, a maximum height difference H between the ridged part and the recessed part of the reflection surface may satisfy: $H<N*\lambda/2$. $\lambda$ is a vacuum wavelength corresponding to an operating frequency of the radiating element. The operating frequency of the radiating element is a frequency of a wireless signal generated by the radiating element. Propagation of the wireless signal (electromagnetic wave) satisfies $v=\lambda*f$. v is a propagation speed of the electromagnetic wave, $\lambda$ is a wavelength of the electromagnetic wave, and f is a frequency of the electromagnetic wave. Because electromagnetic waves travel at different speeds in different media, a frequency and a wavelength when electromagnetic waves travel in vacuum are usually converted.

In addition, in the first direction, a spacing between two adjacent radiating elements may be $0.5\lambda$ to $\lambda$. It may be understood that, in actual application, in the first direction, the spacing between two adjacent radiating elements may be properly adjusted based on an actual situation. This is not specifically limited in this application.

Certainly, in actual application, the antenna assembly may alternatively adjust, in a phase weighting manner, a phase of the wireless signal transmitted by the radiating element, and a level value of radiation of the entire radiating array in the high-altitude direction may be reduced in a phase superposition manner. During specific implementation, the antenna assembly may further include a phase shifter. The phase shifter may be connected to the radiating element, and is configured to change the phase of the wireless signal transmitted by the radiating element.

In addition, an embodiment of this application further provides an antenna assembly array, including a plurality of any one of the foregoing antenna assemblies, and the plurality of antenna assemblies are at least sequentially disposed along the first direction. A plurality of antenna assemblies may implement higher performance than a single antenna assembly, and this helps to improve a gain of the antenna assembly. It may be understood that, in some implementations, the antenna assembly array may further include a plurality of antenna assemblies sequentially disposed along a second direction. The second direction is located on the reflection surface and is perpendicular to the first direction.

In the first direction, the spacing between two adjacent radiating elements may be $0.5\lambda$ to $\lambda$. In the second direction, a spacing between two adjacent radiating elements may be about $0.5\lambda$. It may be understood that, in actual application, in the first direction and in the second direction, spacings between two adjacent radiating elements may be properly adjusted based on an actual situation. This is not specifically limited in this application.

According to another aspect, an embodiment of this application further provides a base station, including a power amplifier and any one of the foregoing antenna assemblies. The power amplifier is electrically connected to a radiating element of the antenna assembly, to excite the radiating element, so that the radiating element can generate a wireless signal to the outside. In specific application, the base station may further include components such as a processor, a filter, a phase shifter, and a power divider. A quantity and specific types of the components included in the base station are not limited in this application.

DESCRIPTION OF EMBODIMENTS

To make objectives, technical solutions, and advantages of this application clearer, the following further describes this application in detail with reference to accompanying drawings.

To facilitate understanding of an antenna assembly provided in embodiments of this application, the following first describes an application scenario of the antenna assembly.

The antenna assembly provided in embodiments of this application may be used in a communication device such as a base station or a radar, to implement a wireless communication function.

Figure 1:
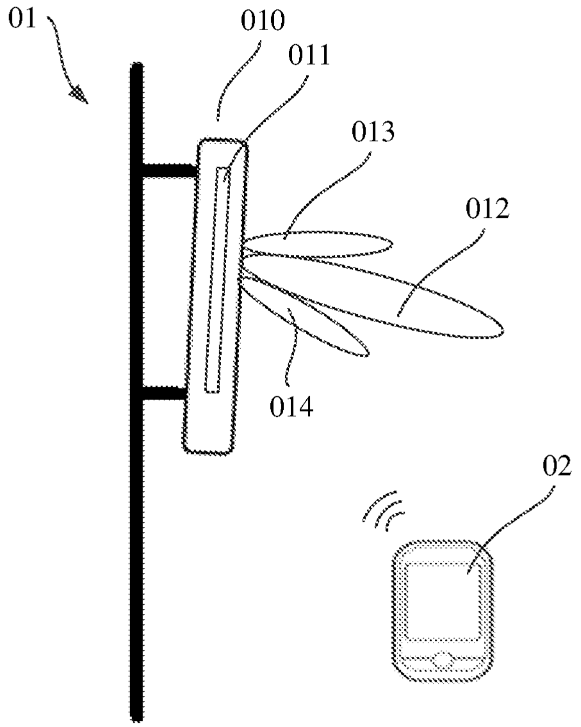
FIG. 1 is a schematic diagram of an application scenario of an antenna assembly according to an embodiment of this application.

As shown in FIG. 1, in actual application, an antenna assembly 011 is usually installed in a radome 010, to form an overall structure. The radome 010 is a mechanical part that protects the antenna assembly 011 from being affected by an external environment, and has good electromagnetic wave penetration. When the antenna assembly 011 is used in the external environment, the radome 010 may prevent the antenna assembly 011 from being affected by factors such as rain, sunlight, and dust. In addition, the radome 010 can further avoid adverse impact such as interference to transmission of a wireless signal between the antenna assembly 011 and the external environment.

As shown in FIG. 1, a base station 01 is used as an example. A terrestrial communication device 02 (for example, a smartphone used by a user) usually needs to perform signal transmission with the base station 01. In actual application, according to a network coverage requirement, the overall structure formed by the antenna assembly 011 and the radome 010 usually has a specific downtilt angle, to ensure that a network signal can better cover a target area and reduce high altitude radiation of the wireless signal.

In addition, when the antenna assembly 011 operates normally, in an antenna pattern, the antenna assembly 011 usually includes one main maximum radiation area 012 (which may be referred to as a main lobe) and several secondary maximum radiation areas (which may be referred to as side lobes). In the figure, two side lobes are shown: an upper side lobe 013 and a lower side lobe 014. In actual application, when a level value of the upper side lobe 013 is higher than a limit value (for example, −30 dB), signal interference is caused to another surrounding base station. Therefore, the upper side lobe 013 needs to be suppressed.

In addition, with further development of wireless communication, in the fifth generation mobile communication technology (5G for short), a new frequency band has been gradually opened for application. For example, a low frequency band (for example, 3.4 GHz to 4.2 GHz) of a downlink of a satellite applied to a satellite earth station has been opened for 5G application. An uplink frequency band (for example, 5.85 GHz to 6.425 GHz) of the satellite is not available because a 5G base station antenna may cause interference to an uplink of the satellite. How to enable a downlink of a base station and an uplink of a satellite to operate on a same frequency band is also an urgent technical problem to be resolved currently.

Currently, a main problem that restricts coexistence of the base station 01 and the satellite on a same frequency band is that satellite reception is interfered with when transmit power of the antenna assembly 011 in the base station 01 is excessively high. Therefore, to implement coexistence of the base station 01 and the satellite on a same frequency band, a first problem to be resolved is how to reduce the transmit power of the antenna assembly 011 in the base station 01 in the high altitude, in other words, the upper side lobe of the antenna assembly 011 needs to be effectively suppressed.

Currently, the upper side lobe of the antenna assembly 011 is suppressed mainly in two manners: algorithm control and structural design.

The algorithm control mainly adopts array amplitude weighting, phase weighting, or a combination of the array amplitude weighting and the phase weighting to suppress the upper side lobe. However, in this manner, radiation efficiency of the antenna assembly 011 may be significantly reduced.

Currently, algorithm control performed on the antenna assembly 011 mainly includes a one-to-N architecture and a one-to-one architecture. Specifically, the one-to-N architecture may include one power amplifier (PA) and N radiating elements. The radiating element is a device configured to generate or receive a wireless signal. The power amplifier is connected to the N radiating elements, and is configured to drive the radiating elements to generate wireless signals. In this case, amplitude weighting and phase weighting of the radiating element may be implemented by controlling a feeding network, to suppress the upper side lobe. However, in the one-to-N architecture, a loss of the feeding network (for example, a power divider or a phase shifter) is large. In addition, when a quantity of radiating elements is large and an operating frequency band is high, a generated loss is more obvious. In addition, after the amplitude weighting is performed, radiation efficiency of an aperture of the antenna assembly 011 also has an obvious loss.

The one-to-one architecture may include one power amplifier, one phase shifter, and one radiating element. Alternatively, it may be understood that each radiating element usually uses an independent power amplifier and an independent phase shifter. The phase shifter is configured to adjust a phase of a wireless signal generated by the radiating element. However, it is difficult to implement the amplitude weighting by using the one-to-one architecture. Therefore, it is difficult to suppress the upper side lobe.

In addition, in terms of the structural design, the following means are mainly used to suppress the upper side lobe of the antenna assembly 011.

Figure 2:
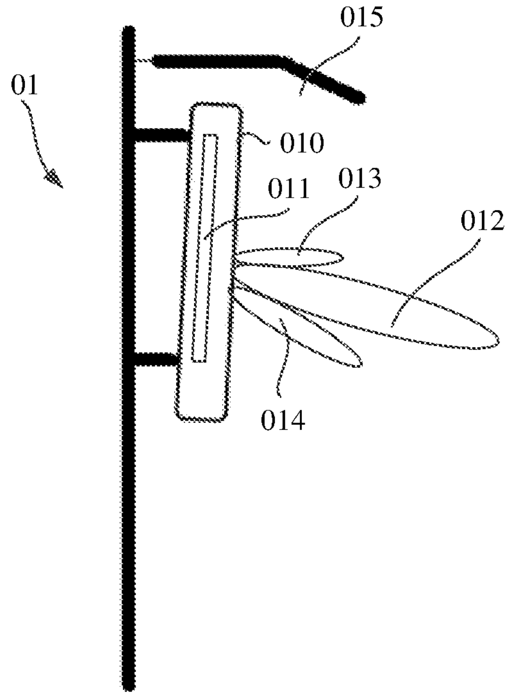
FIG. 2 is a schematic diagram of another application scenario of an antenna assembly according to an embodiment of this application.

As shown in FIG. 2, a baffle 015 may be added above the radome 010 shown in FIG. 1, so that the upper side lobe 013 of the antenna assembly 011 may be shielded to some extent. However, in this manner, a size of an entire antenna device is obviously increased, and adverse impact such as suppression is also caused on a primary beam 012 of the antenna assembly 011.

Based on the foregoing reasons, embodiments of this application provide an antenna assembly that can well suppress an upper side lobe of the antenna assembly and does not affect radiation efficiency.

To make the objectives, technical solutions, and advantages of this application clearer, the following further describes this application in detail with reference to the accompanying drawings and specific embodiments.

Terms used in the following embodiments are merely intended to describe specific embodiments, but are not intended to limit this application. Terms "one", "a", and "this" of singular forms used in this specification and the appended claims of this application are also intended to include a form like "one or more", unless otherwise specified in the context clearly. It should be further understood that, in the following embodiments of this application, "at least one" means one, two, or more.

Reference to "one embodiment" described in this specification or the like means that one or more embodiments of this application include a particular feature, structure, or characteristic described in combination with the embodiment. Therefore, in this specification, statements, such as "in an embodiment", "in some embodiments", and "in other embodiments", that appear at different places do not necessarily mean referring to a same embodiment, instead, the statements mean "one or more but not all of the embodiments", unless otherwise specifically emphasized in other ways. Terms "include", "have", and variants of the terms all mean "include but are not limited to", unless otherwise specifically emphasized in other ways. In embodiments of this application, an antenna assembly 10 mentioned in FIG. 3 to FIG. 12 is equivalent to the antenna assembly 011 shown in FIG. 1 and FIG. 2.

Figure 3:
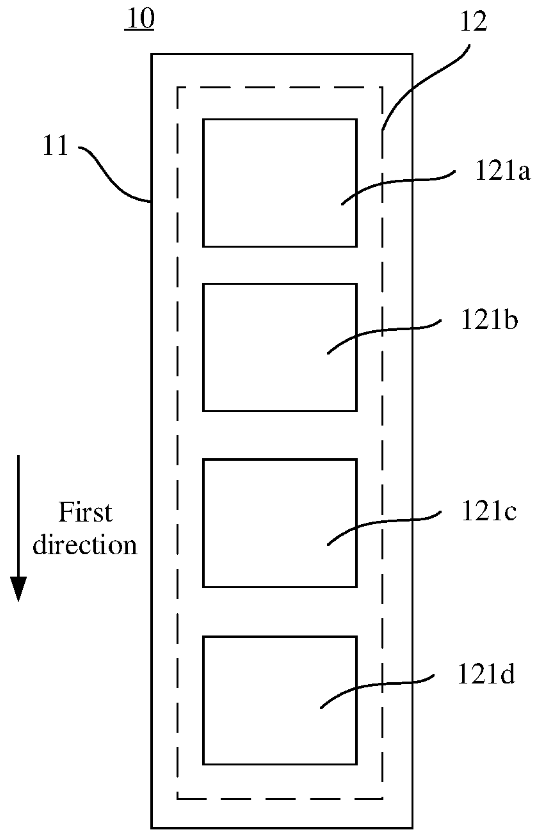
FIG. 3 is a front view of an antenna assembly according to an embodiment of this application.
Figure 4:
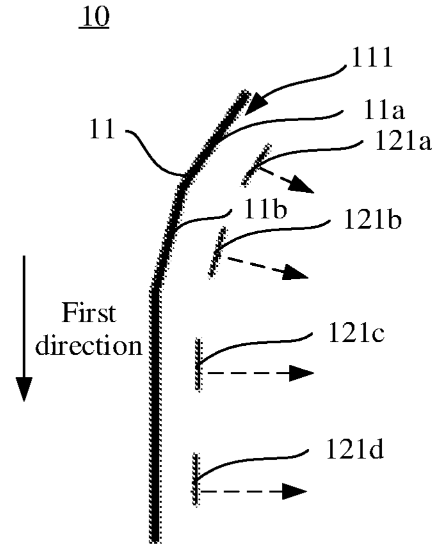
FIG. 4 is a side view of an antenna assembly according to an embodiment of this application.

As shown in FIG. 3 and FIG. 4, FIG. 3 is a front view of the antenna assembly 10 according to an embodiment of this application, and FIG. 4 is a side view of the antenna assembly 10 according to an embodiment of this application.

Refer to FIG. 3 and FIG. 4. The antenna assembly 10 includes a reflection panel 11 and a radiating array 12. The reflection panel 11 includes a reflection surface 111, and the radiating array 12 is disposed on the reflection surface 111. The radiating array 12 includes four radiating elements, which are separately radiating elements 121*a*, 121*b*, 121*c*, and 121*d*. On the reflection surface 111, the four radiating elements 121 are sequentially disposed along a first direction. In addition, as shown in FIG. 4, dashed arrows in the figure separately indicate radiation directions of the corresponding radiating elements. The reflection surface 111 includes two deflection surfaces, namely, a deflection surface 11*a* and a deflection surface 11*b*. The four radiating elements are all attached to the reflection surface 111. Specifically, the radiating element 121*a* is attached to the deflection surface 11*a*, so that a radiation direction of the radiating element 121*a* is disposed at an acute angle with the first direction. The radiating element 121*b* is attached to the deflection surface 11*b*, so that a radiation direction of the radiating element 121*b* is disposed at an acute angle with the first direction. The radiating element 121*c* and the radiating element 121*d* are attached to a non-deflected area of a lower part of the reflection surface 111, so that radiation directions of the radiating element 121*c* and the radiating element 121*d* are substantially perpendicular to the first direction.

In the antenna assembly 10 provided in this embodiment of this application, to enable the radiation directions of the radiating element 121*a* and the radiating element 121*b* to be disposed at an acute angle with the first direction, the reflection surface 111 includes the deflection surfaces, and the radiating elements are all attached to the reflection surface.

Figure 5:
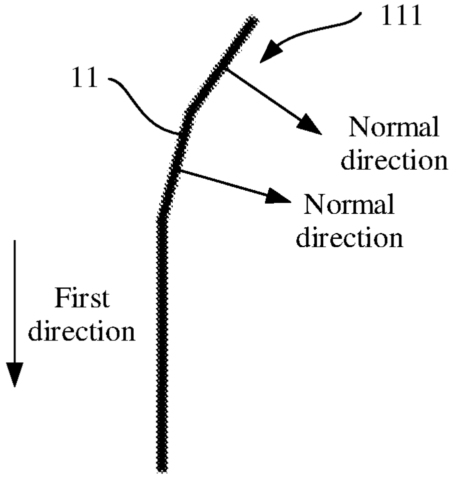
FIG. 5 is a side view of a reflection panel in FIG. 4.

Refer to FIG. 4 and FIG. 5. FIG. 5 is a side view of the reflection panel 11 according to an embodiment of this application. In FIG. 4, normal directions of the deflection surface 11*a* and the deflection surface 11*b* are disposed at an acute angle with the first direction. A normal direction of a deflection surface is a direction extending away from the deflection surface along a normal direction of the deflection surface starting from a point on the deflection surface. The radiating element 121*a* is attached to the deflection surface 11*a*, and the radiating element 121*b* is attached to the deflection surface 11*b*. Therefore, the radiation direction of the radiating element 121*a* is disposed at the acute angle with the first direction, and the radiation direction of the radiating element 121*b* is disposed at the acute angle with the first direction.

It may be understood that in the antenna assembly 10 provided in this embodiment of this application, the first direction uses a structure of the reflection panel 11 as a reference. In other words, the first direction may be a direction from a first end (an upper end in the figure) to a second end (a lower end in the figure) of the reflection panel 11. Therefore, during actual installation and use, a posture of the antenna assembly 10 may be adjusted based on an actual situation, so that the first direction is perpendicular to the ground, or is substantially perpendicular to the ground.

For example, in actual application, if the ground is used as a reference, the first direction may be a direction that is substantially perpendicular to the ground and points to the ground. The radiation directions of the radiating elements 121*a*, 121*b*, 121*c*, and 121*d* are maximum radiation directions of main lobes in antenna patterns of the radiating elements. In actual application, when the antenna assembly 10 is used in a communication device, for example, a base station, the first direction may point vertically to the ground, or be substantially perpendicular to the ground.

When the radiation directions of the radiating element 121*a* and the radiating element 121*b* are disposed at an acute angle with a direction that points vertically to the ground (for example, the first direction), main lobes, upper side lobes, and lower side lobes all tilt toward the ground in antenna patterns of the radiating element 121*a* and the radiating element 121*b*, so that level values of radiation of the radiating element 121*a* and the radiating element 121*b* in a high-altitude direction can be reduced.

In addition, refer to FIG. 3 and FIG. 4. For the entire radiating array 12, according to a principle of pattern multiplication for antenna array, when the radiation directions of the radiating elements 121*a* and 121*b* are at the acute angle with the first direction, an upper side lobe of the antenna assembly 10 may be effectively suppressed, thereby reducing radiation power of the antenna assembly 10 in the high altitude. For the principle of pattern multiplication for antenna array, in general, the patterns of all the radiating elements in the radiating array 12 are superimposed, to obtain a pattern of the entire radiating array 12. In the pattern of the entire radiating array 12, the radiation directions of the radiating elements 121*a* and 121*b* tilt toward the ground. Therefore, after the antenna patterns of the radiating elements 121*a*, 121*b*, 121*c*, and 121*d* are superimposed, a level value of radiation of the entire radiating array 12 in the high-altitude direction decreases. In addition, the radiating array 12 may reduce the level value of radiation in the high-altitude direction without performing weighting (for example, array amplitude weighting, phase weighting, or a combination of the array amplitude weighting and the phase weighting). Therefore, each radiating element may further implement same transmit power, and aperture utilization is high, so that radiation efficiency of the antenna assembly 10 is not affected. It should be noted that the radiating array 12 represents a set of several radiating elements disposed along the first direction, and a quantity and an arrangement position of the radiating elements are not limited. In summary, in actual application, a single radiating array 12 may include N radiating elements, where N is an integer greater than 1.

During specific implementation, an included angle between the radiation direction of the radiating element 121*a* and the first direction and an included angle between the radiation direction of the radiating element 121*b* and the first direction may be the same or different. Alternatively, it may also be understood that an included angle between the normal direction of the deflection surface 11*a* and the first direction and an included angle between the normal direction of the deflection surface 11*b* and the first direction may be the same or different. In addition, in the embodiment provided in this application, neither the radiating element 121*c* nor the radiating element 121*d* is deflected downward, in other words, the radiation direction of the radiating element 121*c* and the radiation direction of the radiating element 121*d* are substantially parallel to a horizontal direction. It may be understood that, in another implementation, radiation direction of the radiating element 121*c* may alternatively be disposed at an acute angle with the first direction. Correspondingly, the radiation direction of the radiating element 121*d* may alternatively be disposed at an acute angle with the first direction.

In summary, in actual application, the radiating array 12 may include N radiating elements, where N is an integer greater than 1. In addition, a radiation direction of at least one radiating element in the radiating array 12 may be disposed at an acute angle with the first direction. When there are a plurality of radiating elements whose radiation directions are disposed at an acute angle with the first direction, included angles between all the radiating elements and the first direction may be the same or different.

The radiating element is mainly configured to transmit a wireless signal or receive a wireless signal. In actual application, the radiating element may be a patch antenna, a dipole antenna, or the like. During manufacturing, the radiating element may be manufactured by using a process such as metal die casting, plastic electroplating, or patching. A specific type and a preparation process of the radiating element are not specifically limited in this application.

The reflection panel 11 is mainly configured to provide an installation position for the radiating element, so that the radiating element can be firmly fastened to the reflection surface 111. In addition, the reflection panel 11 can further play gain and anti-interference roles for the radiating element. Specifically, under action of the reflection panel 11, when the radiating element generates a wireless signal that propagates toward a direction of the reflection panel 11, the reflection panel 11 can play a reflection function to some extent. In this way, the wireless signal generated by the radiating element can be radiated more efficiently toward a direction facing the reflection surface 111, and signal receiving efficiency of the radiating element can also be effectively improved, thereby achieving a gain. In addition, under the action of the reflection panel 11, another electromagnetic wave from the back (an opposite direction of the reflection surface 111) can be blocked, to prevent the electromagnetic wave from interfering with the radiating element, thereby implementing anti-interference. It may be understood that, in actual application, the reflection panel 11 generally includes two plate surfaces that are opposite to each other. One plate surface may be used as the reflection surface 111, and the other plate surface is used as a rear surface. That is, the N radiating elements in the radiating array 12 are all located on a same plate surface of the reflection panel 11.

In specific application, the reflection panel 11 may be prepared by using a metal material such as aluminum or stainless steel. Alternatively, the reflection panel 11 may be a structure such as a printed circuit board. A material and a type of the reflection panel 11 are not specifically limited in this application.

In addition, in actual application, connection forms between the reflection panel 11 and the radiating element may be diversified.

For example, during installation, the radiating element may be fastened to the reflection surface 111 in a manner such as welding or bonding. Alternatively, the radiating element may be fastened to the reflection surface 111 by using a screw, a rivet, or the like. Alternatively, each radiating element may be fastened to the reflection surface 111 by using an auxiliary mechanical part such as a support. In addition, in some implementations, spacings between all the radiating elements and the reflection surface 111 may be the same or different. Alternatively, it may be understood that heights of supports used to fasten all the radiating elements may be the same or different.

In addition, in some implementations, a position of the deflection surface on the reflection surface 111 may be flexibly set.

For example, as shown in FIG. 5, the deflection surface 11*a* and the deflection surface 11*b* are sequentially disposed along the first direction from an upper end of the reflection surface 111.

Figure 6:
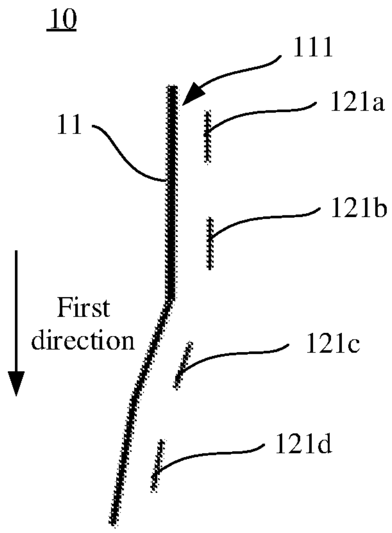
FIG. 6 is a side view of another antenna assembly according to an embodiment of this application.

Alternatively, as shown in FIG. 6, the deflection surface 11*a* and the deflection surface 11*b* may be sequentially disposed along an opposite direction of the first direction from a lower end of the reflection surface 111.

Figure 7:
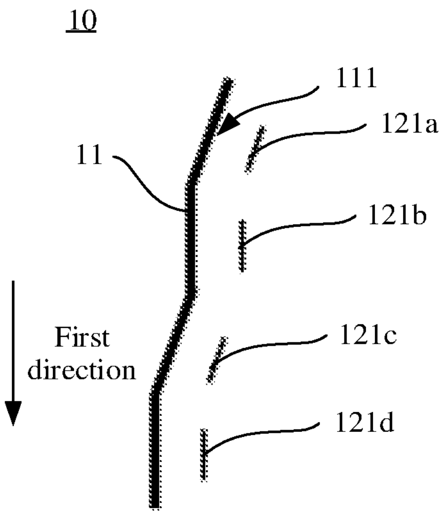
FIG. 7 is a side view of another antenna assembly according to an embodiment of this application.

Alternatively, as shown in FIG. 7, in another embodiment provided in this application, the deflection surface 11*a* is located in a middle and upper section of the reflection surface 111, and the deflection surface 11*b* is located in a middle and lower section of the reflection surface 111.

It may be understood that in the reflection panel 11 shown in FIG. 4 to FIG. 7, all deflection surfaces (such as the deflection surface 11*a* and the deflection surface 11*b*) are plane structures. Certainly, in another implementation, the deflection surface may alternatively be a curved surface or another irregular structure. In addition, only one radiating element may be attached to each deflection surface. Alternatively, two or more radiating elements may be sequentially disposed on each deflection surface along the first direction.

Further, from an overall perspective of the reflection surface 111, the entire reflection surface 111 may be an undulating structure having a ridged part and a recessed part.

Figure 8:
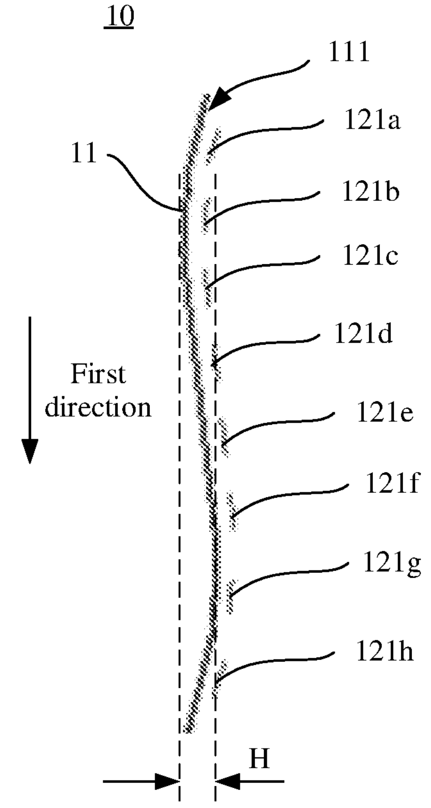
FIG. 8 is a side view of another antenna assembly according to an embodiment of this application.

For example, as shown in FIG. 8, in another embodiment provided in this application, along the first direction, the reflection surface 111 is the undulating structure having the ridged part and the recessed part from a direction perpendicular to the reflection surface 111. Specifically, a cross section of the reflection surface 111 may be sinusoidal linear with ups and downs. In FIG. 8, eight radiating elements are shown, which are separately radiating elements 121*a*, 121*b*, 121*c*, 121*d*, 121*e*, 121*f*, 121*g*, and 121*h*. All the radiating elements are attached to the reflection surface 111, a radiation direction of the radiating element 121*a* is disposed at an acute angle with the first direction, and a radiation direction of the radiating element 121*b* is substantially perpendicular to the first direction. Radiation directions of the radiating elements 121*c*, 121*d*, 121*e*, and 121*f* are disposed at an obtuse angle with the first direction. A radiation direction of the radiating element 121*g* is substantially perpendicular to the first direction, and a radiation direction of the radiating element 121*h* is disposed at an acute angle with the first direction. It may be understood that, during specific installation, if the ground is used as a reference plane, the entire antenna assembly 10 may be tilted downward (for example, rotating by a specific angle in a clockwise direction) to prevent uptilt angles from being generated between the radiating elements 121*c*, 121*d*, 121*e*, and 121*f* and the ground. A downtilt angle of the antenna assembly may be properly adjusted based on an actual requirement. This is not limited in this application.

In addition, in another implementation, along the first direction, from a direction perpendicular to the reflection surface 111, the reflection surface 111 may alternatively be a fold-line shape, another irregular shape, or the like. A specific shape profile of the reflection surface 111 is not limited in this application.

As shown in FIG. 8, the reflection surface 111 is in an undulating shape with ups and downs. During implementation, the radiating elements need to be firmly installed on an installation surface to ensure connection strength between the radiating elements and the reflection panel 11. Therefore, in specific implementation, a height difference H between a peak and a trough of the reflection surface 111 may be less than N*λ/2. N is a quantity of radiating elements 121, and λ is a vacuum wavelength corresponding to an operating frequency of the radiating elements 121. An operating frequency of a radiating element is a frequency of a wireless signal generated by the radiating element. Propagation of the wireless signal (electromagnetic wave) satisfies v=λ*f. v is a propagation speed of the electromagnetic wave, λ is a wavelength of the electromagnetic wave, and f is a frequency of the electromagnetic wave. Because electromagnetic waves travel at different speeds in different media, a frequency and a wavelength when electromagnetic waves travel in vacuum are usually converted.

In addition, a radiating element whose radiation direction is disposed at an acute angle with the first direction may be disposed at an edge of the radiating array (for example, the radiating element 121*a* and the radiating element 121*h*), and may alternatively be disposed in the middle of the radiating array (for example, the radiating element 121*c* and the radiating element 121*g*). A position, in the radiating array, of the radiating element whose radiation direction is disposed at the acute angle with the first direction is not limited in this application.

Alternatively, it may also be understood that the deflection surfaces of the reflection surface 111 may be located at a first end (the upper end in the figure) of the reflection surface 111, a second end (the lower end in the figure) of the reflection surface 111, or another position in the middle, upper middle or lower middle of the reflection surface 111.

In addition, in specific application, the antenna assembly 10 may include a plurality of radiating arrays 12.

Figure 9:
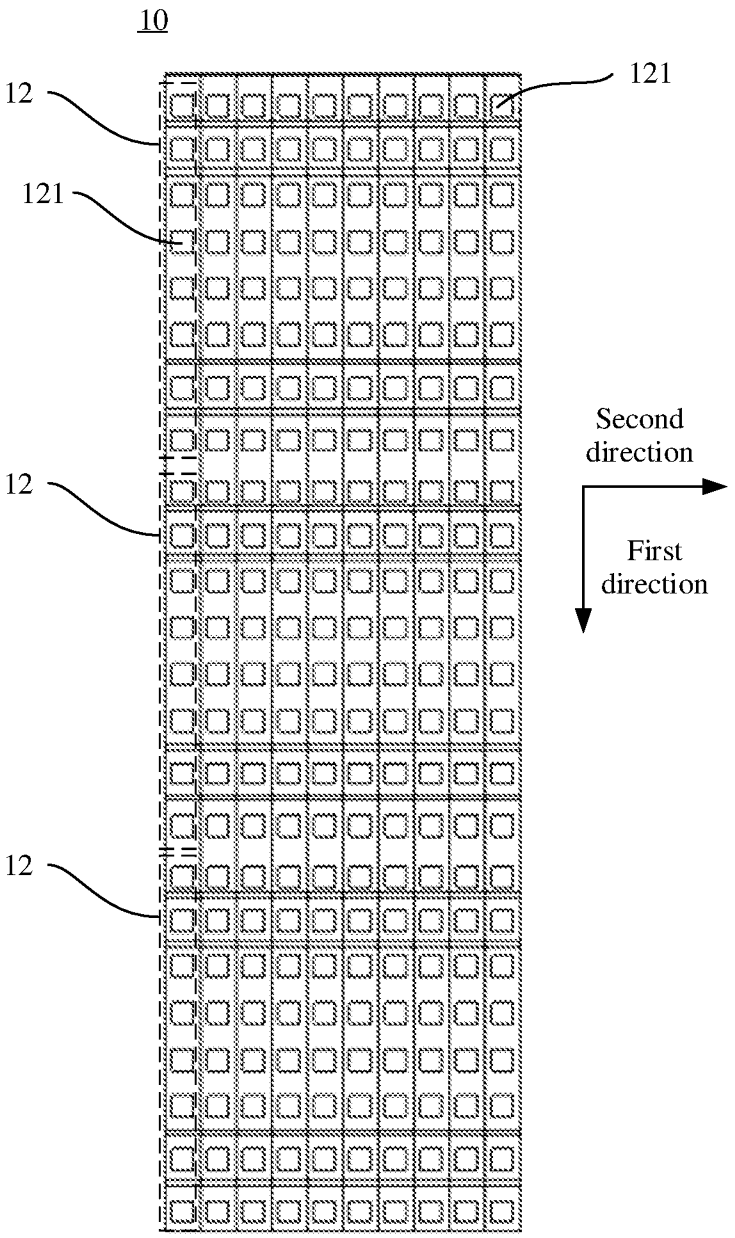
FIG. 9 is a front view of another antenna assembly according to an embodiment of this application.
Figure 10:
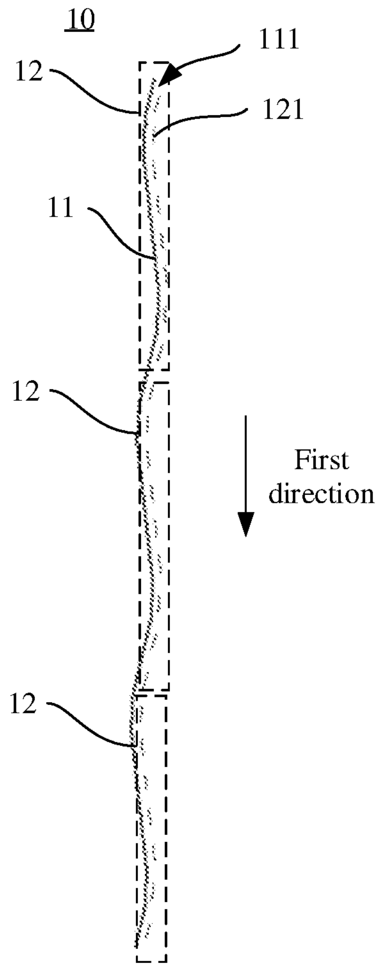
FIG. 10 is a side view of another antenna assembly according to an embodiment of this application.

For example, as shown in FIG. 9 and FIG. 10, in an embodiment provided in this application, the antenna assembly 10 includes 10 columns of radiating array groups (only one column is marked in the figure), and each group includes three radiating arrays 12 that are sequentially disposed along the first direction. Each radiating array 12 includes eight radiating elements 121.

Alternatively, it may also be understood that 240 radiating elements 121 are disposed on the reflection surface 111 of the reflection panel 11, and the radiating elements 121 are arrayed in a form of 10 columns and twenty-four rows.

In the first direction, a spacing between two adjacent radiating elements 121 may be 0.5λ to λ. In the second direction, a spacing between two adjacent radiating elements 121 may be about 0.5λ. λ is the vacuum wavelength corresponding to the operating frequency of the radiating element 121.

It may be understood that, in actual application, in the first direction, the spacing between two adjacent radiating elements 121 may be properly adjusted based on an actual situation. Correspondingly, in the second direction, the spacing between two adjacent radiating elements 121 may also be properly adjusted based on an actual situation. This is not specifically limited in this application.

In addition, in actual application, to improve a system capacity gain of the antenna assembly 10, a quantity of radiating elements 121 in the first direction may be increased as much as possible.

For example, in a large-scale wireless technology (for example, a massive multi-input multi-output (Massive Multi-input Multi-output system, Massive MIMO) system), in the first direction, a quantity of radiating arrays 12 represents a degree of freedom of an antenna assembly array in a vertical dimension. When the degree of freedom in the vertical dimension increases, the array antenna assembly may obtain a higher system capacity gain.

Certainly, in actual application, an overall quantity of radiating elements 121, a quantity of radiating elements 121 disposed in the first direction, and a quantity of radiating elements 121 disposed in the second direction may be properly set based on an actual requirement. This is not specifically limited in this application. In addition, during specific arrangement, a plurality of radiating elements 121 may be disposed in a conventional uniform array manner, or may be disposed in a non-uniform array manner.

To facilitate understanding of beneficial effect of the antenna assembly provided in this embodiment of this application, the following provides specific description with reference to experimental data.

Figure 11:
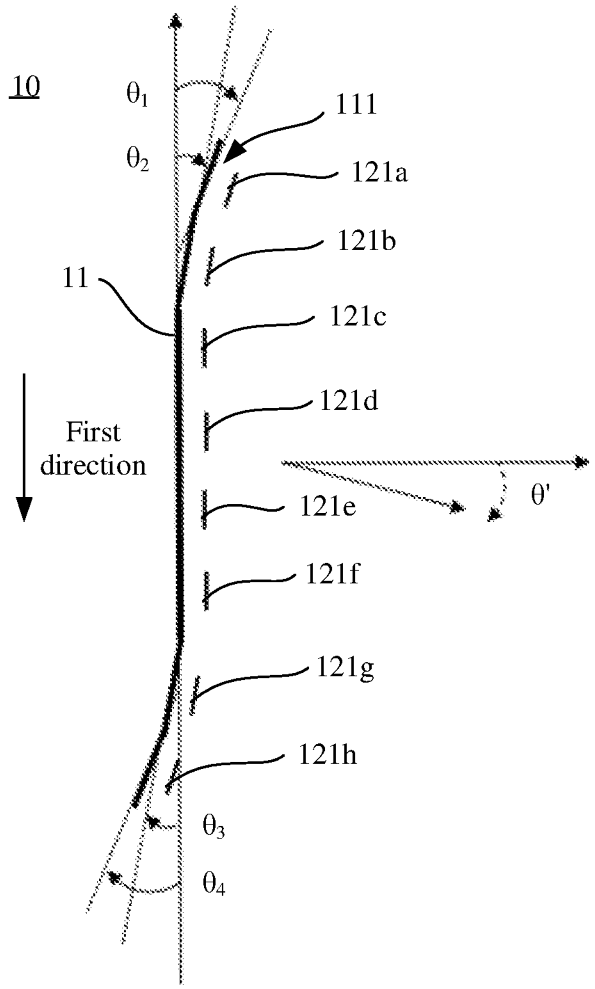
FIG. 11 is a side view of another antenna assembly according to an embodiment of this application.

FIG. 11 shows an antenna assembly 10 according to an embodiment of this application. The antenna assembly 10 includes a reflection panel 11 and eight radiating elements (121*a* to 121*h*) disposed on a reflection surface 111. An upper end and a lower end of the reflection panel 11 each have a downtilt angle. Specifically, the upper end (for example, an area corresponding to the radiating element 121*a*) of the reflection panel 11 has a downtilt angle $\theta_1$ (for example, bending in a clockwise direction). A middle and upper section (for example, an area corresponding to the radiating element 121*b*) of the reflection panel 11 has a downtilt angle $\theta_2$ (for example, bending in a counterclockwise direction). The radiating element 121*a* is disposed on the upper end of the reflection panel 11, and therefore, the radiating element 121*a* has the downtilt angle $\theta_1$. The radiating element 121*b* is disposed on the middle and upper section of the reflection panel 11, and therefore, the radiating element 121*b* has the downtilt angle $\theta_2$. $\theta_1$ is slightly greater than $\theta_2$. In addition, the lower end (for example, an area corresponding to the radiating element 121*h*) of the reflection panel 11 has a downtilt angle $\theta_4$. The middle and upper section (for example, an area corresponding to the radiating element 121*g*) of the reflection panel 11 has a downtilt angle $\theta_3$. The radiating element 121*h* is disposed on the lower end of the reflection panel 11, and therefore, the radiating element 121*h* has the downtilt angle $\theta_4$. The radiating element 121*g* is disposed on the middle and lower section of the reflection panel 11, and therefore, the radiating element 121*g* has the downtilt angle $\theta_3$. $\theta_4$ is slightly greater than $\theta_3$. None of the radiating elements 121*c*, 121*d*, 121*e*, and 121*f* have an obvious tilt angle. θ' is a vertical scanning range of a beam.

Figure 12:
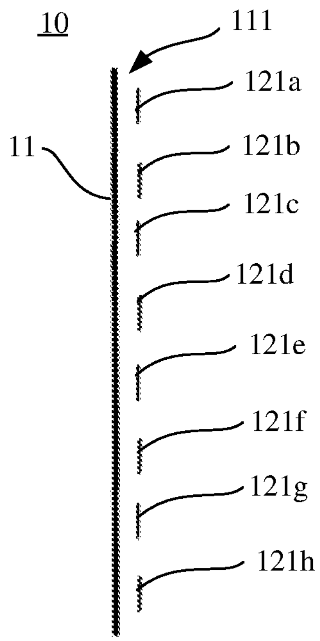
FIG. 12 is a side view of a conventional antenna assembly according to an embodiment of this application.

FIG. 12 shows a conventional antenna assembly, including a plate-shaped reflection panel 11 and eight radiating elements 121*a*, 121*b*, 121*c*, 121*d*, 121*e*, 121*f*, 121*g*, and 121*h*, and none of the eight radiating elements has an obvious tilt angle.

Figure 13:
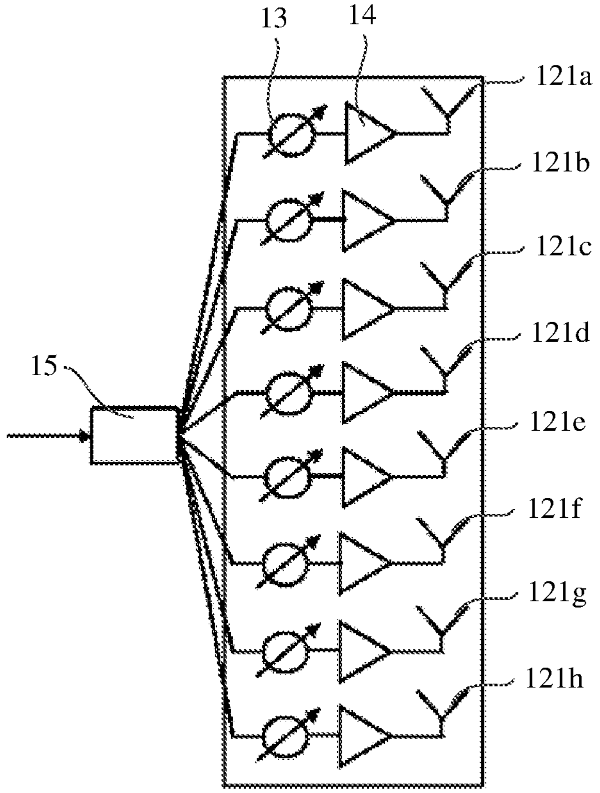
FIG. 13 is a block diagram of a system in which an antenna assembly uses a one-to-one architecture according to an embodiment of this application.

In antenna assemblies shown in FIG. 12 and FIG. 13, a one-to-one architecture may be used.

Specifically, refer to FIG. 13. Each radiating element is equipped with a set of independent phase shifter 13 and independent power amplifier 14. After a signal source completes digital-to-analog conversion by using a digital-to-analog converter 15, the radiating elements 121*a*, 121*b*, 121*c*, 121*d*, 121*e*, 121*f*, 121*g*, and 121*h* are excited separately by using eight sets of phase shifters 13 and power amplifiers 14. In addition, excitation amplitudes for all radiating elements are the same.

Figure 14:
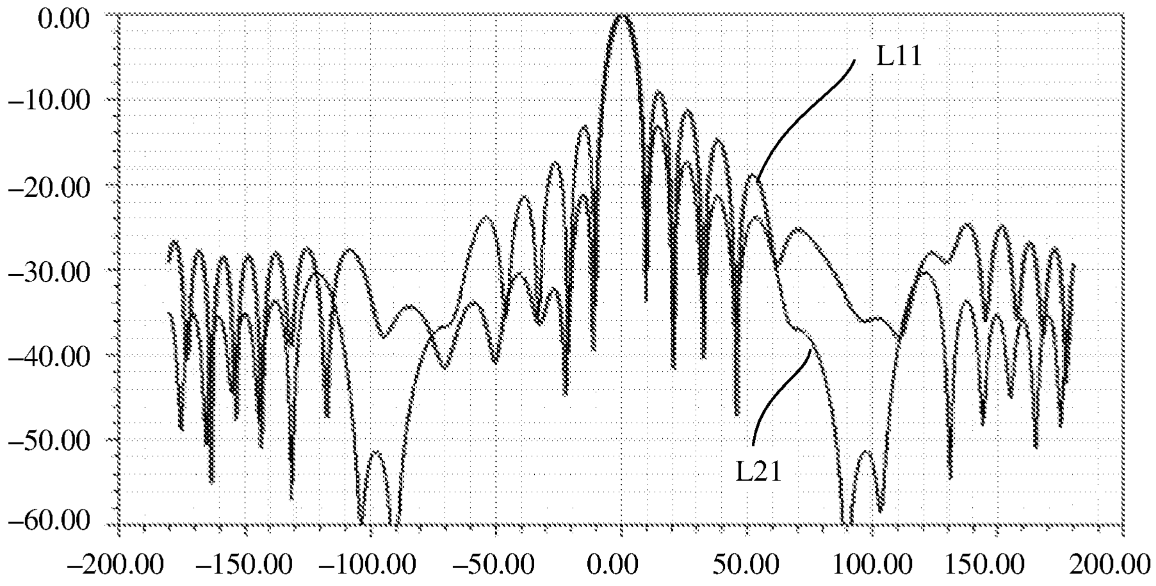
FIG. 14 is a comparison simulation diagram of an antenna assembly pattern according to an embodiment of this application.

FIG. 14 shows patterns of two different types of antennas in FIG. 11 and FIG. 12. In the figure, a horizontal axis represents an angle, and a vertical axis represents radiation efficiency. A curve L11 is a pattern of the antenna assembly 10 shown in FIG. 11. A curve L21 is a pattern of the antenna assembly 10 shown in FIG. 12.

As shown in FIG. 11, the radiating element 121*a*, the radiating element 121*b*, the radiating element 121*g*, and the radiating element 121*h* are deflected toward a first direction, and a phase may be re-assigned by using a phase shifter. The radiating elements 121*c*, 121*d*, 121*e*, and 121*f* are excited in equal phases.

It can be learned from a simulation result in FIG. 14 that, in the antenna assembly shown in FIG. 11, an upper side lobe may be significantly suppressed in a range from 15° to 60°, and a minimum suppression degree is greater than 6 dB.

It can be learned that in the antenna assembly 10 provided in this embodiment of this application, after some radiating elements are deflected downward by a specific angle, the upper side lobe may be significantly suppressed, thereby reducing radiation power of the antenna assembly 10 in a high altitude.

In addition, for a beam downtilt, a downtilt angle of a conventional Massive MIMO antenna assembly is generally between 2° and 12°. Therefore, this embodiment of this application further provides a comparison simulation result of two antenna assembly patterns when the downtilt angle is 6° and the downtilt angle is 12°.

Figure 15:
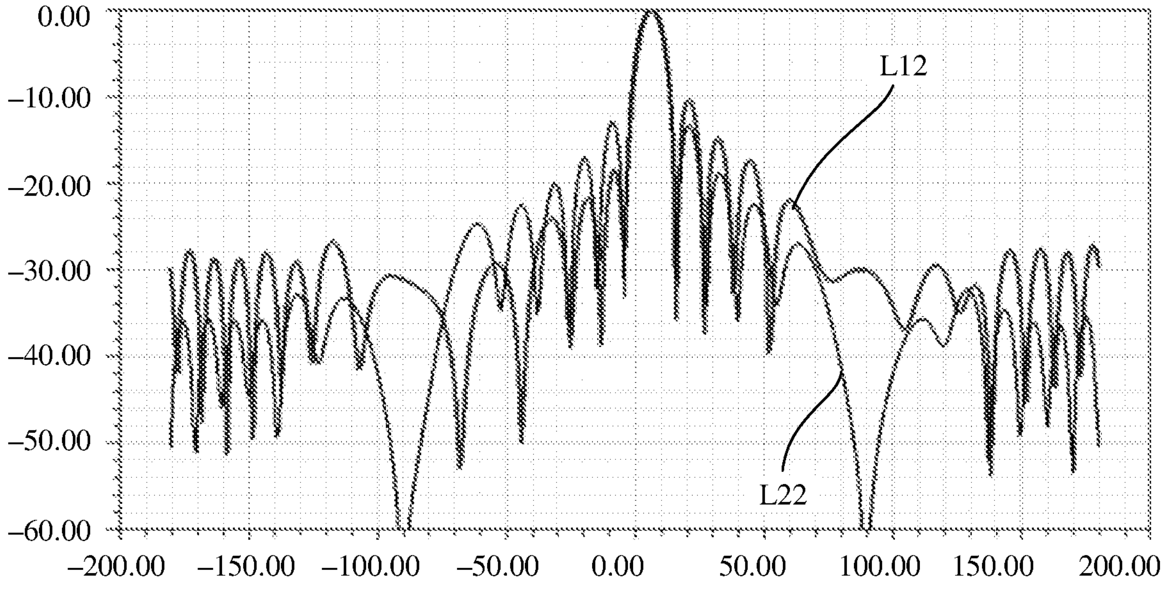
FIG. 15 is a comparison simulation diagram of another antenna assembly pattern according to an embodiment of this application.

FIG. 15 shows patterns of two different types of antenna assemblies when the downtilt angle is 6°. In the figure, a horizontal axis represents an angle, and a vertical axis represents radiation efficiency. A curve L12 is a pattern of the antenna assembly shown in FIG. 11. A curve L22 is a pattern of the antenna assembly shown in FIG. 12.

It can be learned from a simulation result in FIG. 15 that, for the antenna assembly shown in FIG. 11, radiation power of the upper side lobe is reduced by at least 4 dB, so that the radiation power of the antenna assembly in the high altitude can be reduced.

Figure 16:
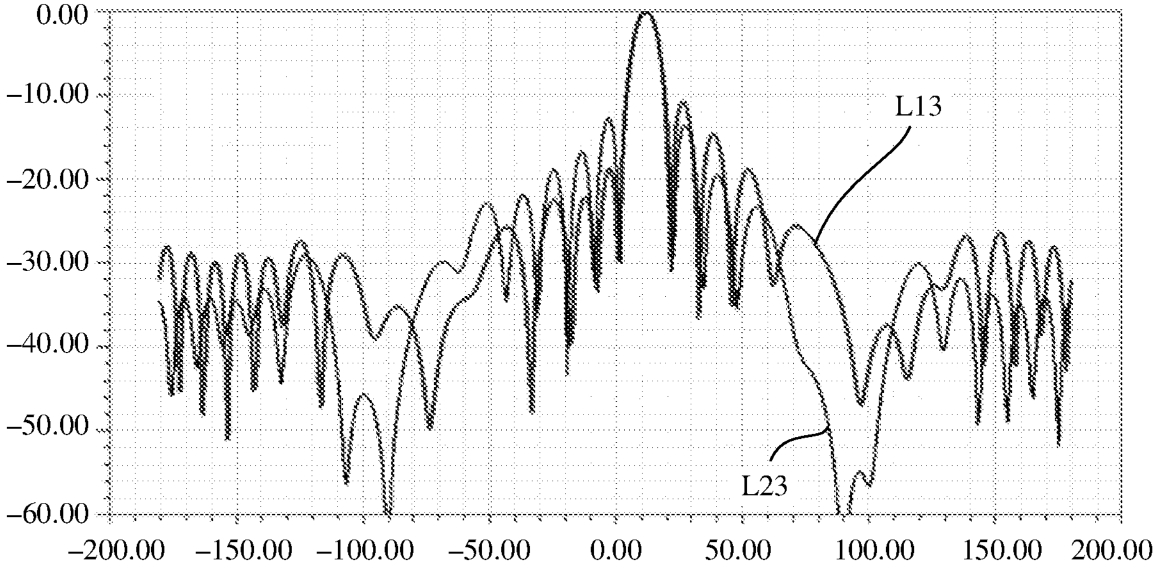
FIG. 16 is a comparison simulation diagram of another antenna assembly pattern according to an embodiment of this application.

FIG. 16 shows patterns of two different types of antenna assemblies when the downtilt angle is 12°. In the figure, a horizontal axis represents an angle, and a vertical axis represents radiation efficiency. A curve L13 is a pattern of the antenna assembly shown in FIG. 11. A curve L23 is a pattern of the antenna assembly shown in FIG. 12.

It can be learned from a simulation result in FIG. 16 that, for the antenna assembly shown in FIG. 11, the radiation power of the upper side lobe is reduced by at least 4 dB, so that the radiation power of the antenna assembly in the high altitude can be reduced.

In addition, in actual application, the radiation power of the antenna assembly may alternatively be effectively controlled in combination with amplitude weighting, to reduce radiation intensity of the upper side lobe.

Figure 17:
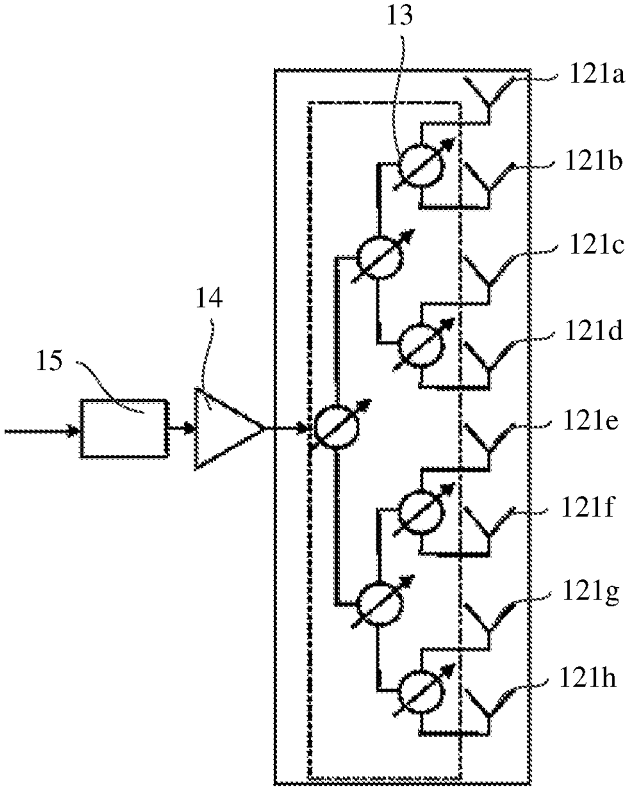
FIG. 17 is a block diagram of a system in which an antenna assembly uses a one-to-eight architecture according to an embodiment of this application.

To facilitate implementation of the amplitude weighting, the antenna assembly may use a one-to-N architecture shown in FIG. 17. For example, a single power amplifier 14 (power amplifier, PA) may be used to drive eight radiating elements. In this case, the amplitude weighting and phase weighting of the radiating element may be implemented by controlling a feeding network, to suppress the upper side lobe. The amplitude weighting means that maximum radiation power of each radiating element is separately controlled, so that radiation power of some radiating elements is high and radiation power of some radiating elements is low. The phase weighting means that phases of wireless signals generated by some radiating elements are controlled, so that wireless signals generated by different radiating elements are superimposed to achieve effect such as gain or cancellation.

For example, the radiation power of the antenna assembly may be effectively controlled in a Taylor weighting manner. For a weighted amplitude value of each radiating element, refer to Table 1.

TABLE 1

| | Radiating element | | | | | | | |
|---|---|---|---|---|---|---|---|---|
| | 121a | 121b | 121c | 121d | 121e | 121f | 121g | 121h |
| Weighted amplitude | 0.38 | 0.58 | 0.84 | 1 | 1 | 0.84 | 0.58 | 0.38 |

In Table 1, a smaller weighted amplitude value indicates smaller radiation power of a corresponding radiating element.

Figure 18:
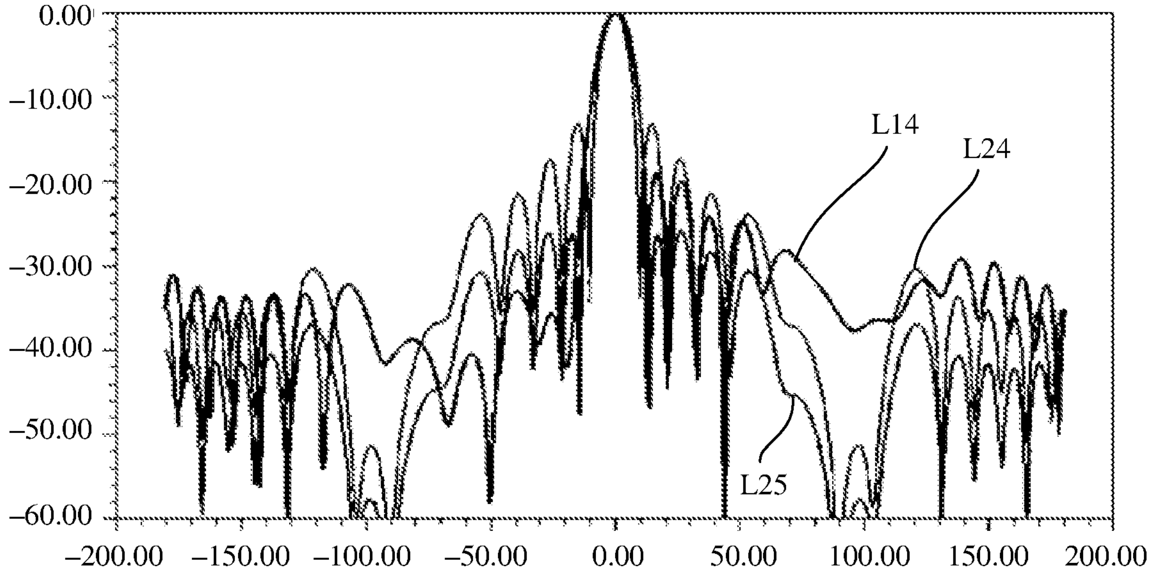
FIG. 18 is a comparison simulation diagram of an antenna assembly pattern according to an embodiment of this application.

FIG. 18 shows a comparison simulation diagram of patterns of three antenna assemblies. In the figure, a horizontal axis represents an angle, and a vertical axis represents radiation efficiency. A curve L24 represents a pattern in which amplitude weighting is not performed on the antenna assembly shown in FIG. 12. A curve L25 represents a pattern obtained after amplitude weighting is performed on the antenna assembly shown in FIG. 12. The curve L14 represents a pattern obtained after amplitude weighting is performed on the antenna assembly shown in FIG. 11.

It can be learned from a simulation result in FIG. 18 that, after amplitude weighting is performed on the antenna assembly shown in FIG. 11, the radiation power of the upper side lobe is less than −31 dB. Compared with the other two antenna assembly patterns, the radiation power of the upper side lobe is reduced by at least 5 dB in a range of −18° to −60°, thereby reducing the radiation power of the antenna assembly in the high altitude.

In addition, during specific implementation, in addition to the Taylor weighting manner, the radiation power of the antenna assembly may be effectively controlled in another weighting manner.

For example, the radiation power of the antenna assembly may alternatively be effectively controlled in a step weighting manner. If input power of the radiating element has N-level gears, for example, 1 W and 0.5 W, for a weighted amplitude value of each radiating element, refer to Table 2.

TABLE 2

| | Radiating element | | | | | | | |
|---|---|---|---|---|---|---|---|---|
| | 121a | 121b | 121c | 121d | 121e | 121f | 121g | 121h |
| Weighted amplitude | 0.7 | 0.7 | 1 | 1 | 1 | 1 | 0.7 | 0.7 |

In Table 2, a smaller weighted amplitude value indicates smaller radiation power of a corresponding radiating element.

Figure 19:
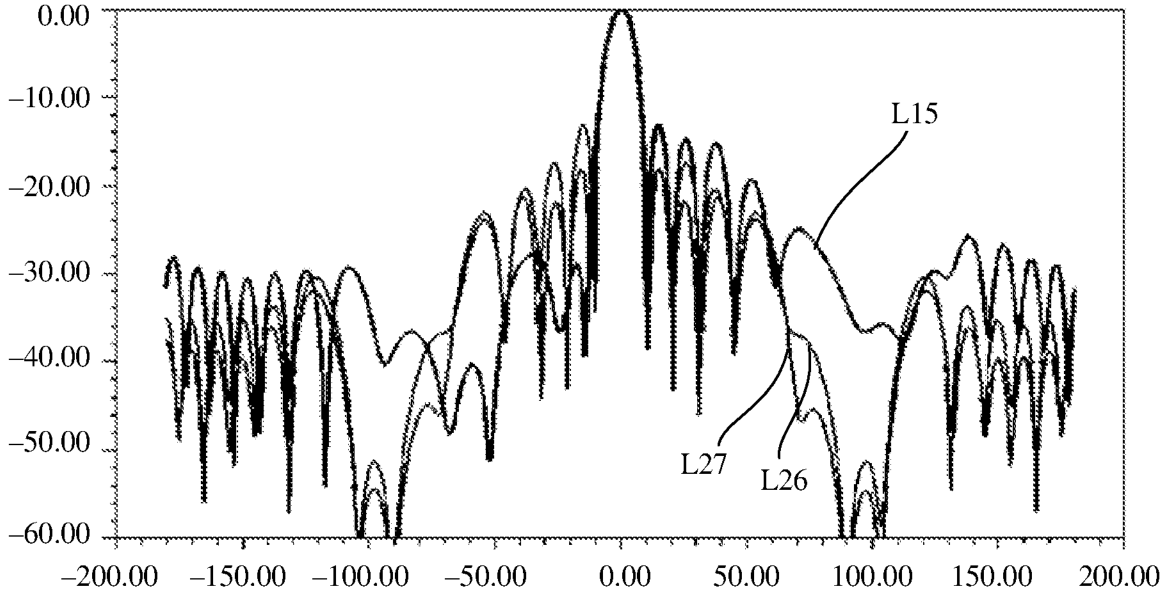
FIG. 19 is a comparison simulation diagram of another antenna assembly pattern according to an embodiment of this application.

FIG. 19 shows a comparison simulation diagram of patterns of three antenna assemblies. In the figure, a horizontal axis represents an angle, and a vertical axis represents radiation efficiency. A curve L26 represents a pattern in which amplitude weighting is not performed on the antenna assembly shown in FIG. 12. A curve L27 represents a pattern obtained after amplitude weighting is performed on the antenna assembly shown in FIG. 12. The curve L15 represents a pattern obtained after amplitude weighting is performed on the antenna assembly shown in FIG. 11.

It can be learned from a simulation result in FIG. 19 that, after amplitude weighting is performed on the antenna assembly shown in FIG. 11, the radiation power of the upper side lobe is less than −31 dB. Compared with the other two antenna assembly patterns, the radiation power of the upper side lobe is reduced by at least 6 dB in a range of −18° to −60°, thereby reducing the radiation power of the antenna assembly in the high altitude.

In summary, in this embodiment provided in this application, after the radiating array has a specific downtilt angle, a level value of radiation of the antenna assembly 10 in a high-altitude direction may be reduced, and the upper side lobe of the radiating array may be effectively suppressed by using a principle of pattern multiplication for antenna array, thereby reducing the radiation power of the antenna assembly 10 in the high altitude. In addition, when the amplitude weighting and the phase weighting processing are not performed, each radiating element may further implement same transmit power, and aperture utilization is high, so that radiation efficiency of the antenna assembly 10 is not affected.

In addition, in actual application, the upper side lobe of the antenna assembly 10 may alternatively be effectively suppressed by combining the amplitude weighting and the phase weighting, to reduce the radiation power of the antenna assembly 10 in the high altitude.

In addition, an embodiment of this application further provides a base station. The base station may be a base station in a wireless communication system. The base station may include a power amplifier and any one of the foregoing antenna assembly 10. The power amplifier is electrically connected to a radiating element of the antenna assembly 10, so that the radiating element may be excited, and the radiating element can generate a wireless signal to the outside. In specific application, the base station may further include components such as a processor, a filter, and a power divider. A quantity and specific types of the components included in the base station are not limited in this application.

In the base station provided in this embodiment of this application, by using the antenna assembly in the foregoing embodiment, radiation power of a wireless signal in a high altitude can be effectively reduced, thereby reducing interference caused to a satellite transmission link. In addition, interference from another nearby base station or a wireless communication device can be further reduced.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna assembly, comprising:
- a reflection panel, comprising a reflection surface; and
- a radiating array, disposed on the reflection surface, wherein the radiating array comprises N radiating elements each configured to transmit or receive a wireless signal,
- the N radiating elements are sequentially disposed on the reflection surface along a first direction,
- the reflection surface comprises a deflection surface, a normal direction of the deflection surface is disposed at an acute angle with the first direction, the N radiating elements are attached to the reflection surface, and at least one radiating element of the N radiating elements is located on the deflection surface, so that a radiation direction of the at least one radiating element is disposed at an acute angle with the first direction, wherein
- N is an integer greater than 1.

2. The antenna assembly according to claim 1, wherein the radiation direction of the at least one radiating element is a maximum radiation direction of a main lobe in a pattern of the radiating element.

3. The antenna assembly according to claim 1, wherein the deflection surface is a plane or a curved surface and deflects radiation from plural ones of the N radiation elements toward the first direction.

4. The antenna assembly according to claim 1, wherein when radiation directions of at least two radiating elements in the N radiating elements are disposed at an acute angle with the first direction, included angles between the at least two radiating elements and the first direction are the same or different.

5. The antenna assembly according to claim 1, wherein the reflection panel comprises a first end and a second end, and the first end and the second end are opposite ends; and
- a direction from the first end to the second end is the first direction.

6. The antenna assembly according to claim 5, wherein a deflection area is located at least the first end or the second end of the reflection panel.

7. The antenna assembly according to claim 1, wherein the reflection surface is in an undulating shape having a ridged part and a recessed part along the first direction.

8. The antenna assembly according to claim 7, wherein a maximum height difference H between the ridged part and the recessed part of the reflection surface satisfies: $H<N*\lambda/2$, wherein
- λ is a vacuum wavelength corresponding to an operating frequency of the at least one radiating element.

9. The antenna assembly according to claim 1, wherein in the first direction, a spacing between two adjacent radiating elements is 0.5 λ to λ, wherein
- λ is vacuum wavelength corresponding to operating frequency of the at least one radiating element.

10. The antenna assembly according to claim 1, further comprising a phase shifter, wherein the phase shifter is connected to the at least one radiating element, to change a phase of the wireless signal transmitted by the at least one radiating element.

11. An antenna assembly array, comprising a plurality of antenna assemblies, wherein the plurality of antenna assemblies are at least sequentially disposed along a first direction;
- wherein, the antenna assembly comprises:
- a reflection panel, comprising a reflection surface; and
- a radiating array, disposed on the reflection surface, wherein the radiating array comprises N radiating elements, each configured to transmit or receive a wireless signal,
- the N radiating elements are sequentially disposed on the reflection surface along a first direction,
- the reflection surface comprises a deflection surface, a normal direction of the deflection surface is disposed at an acute angle with the first direction, the N radiating elements are attached to the reflection surface, and at least one radiating element of the N radiating elements is located on the deflection surface, so that a radiation direction of the at least one radiating element is disposed at an acute angle with the first direction, wherein
- N is an integer greater than 1.

12. The antenna assembly array according to claim 11, wherein the antenna assembly array further comprises a plurality of antenna assemblies sequentially disposed along a second direction; and the second direction is located on a reflection surface and is perpendicular to the first direction.

13. The antenna assembly array according to claim 12, wherein in the second direction, a spacing between two adjacent radiating elements is 0.5 λ, wherein λ is a vacuum wavelength corresponding to an operating frequency of the at least one radiating element.

14. The antenna assembly array according to claim 11, wherein the radiation direction of the at least one radiating element is a maximum radiation direction of a main lobe in a pattern of the radiating element.

15. The antenna assembly array according to claim 11, wherein the deflection surface is a plane or a curved surface, and deflects radiation from plural ones of the N radiation elements toward the first direction.

16. A base station, comprising a power amplifier and an antenna assembly, wherein the power amplifier is electrically connected to a radiating element of the antenna assembly, and is configured to excite the radiating element;

wherein, the antenna assembly, comprises:

a reflection panel, comprising a reflection surface; and a radiating array, disposed on the reflection surface, wherein the radiating array comprises N radiating elements, each radiating element is configured to transmit or receive a wireless signal, the N radiating elements are sequentially disposed on the reflection surface along a first direction, the reflection surface comprises a deflection surface, a normal direction of the deflection surface is disposed at an acute angle with the first direction, the N radiating elements are attached to the reflection surface, and at least one radiating element of the N radiating elements is located on the deflection surface, so that a radiation direction of the at least one radiating element is disposed at an acute angle with the first direction, wherein N is an integer greater than 1.

17. The base station according to claim 16, wherein the radiation direction of the at least one radiating element is a maximum radiation direction of a main lobe in a pattern of the at least one radiating element.

18. The base station according to claim 16, wherein the deflection surface is a plane or a curved surface, and deflects radiation from plural ones of the N radiation elements toward the first direction.

19. The base station according to claim 16, wherein when radiation directions of at least two radiating elements in the N radiating elements are disposed at an acute angle with the first direction, included angles between the at least two radiating elements and the first direction are the same or different.

20. The base station according to claim 16, wherein the reflection panel comprises a first end and a second end, and the first end and the second end are opposite ends; and a direction from the first end to the second end is the first direction.

* * * * *